June 7, 1966  G. W. WASSELL  3,254,432
DATA DISPLAYING DEVICE
Filed Dec. 24, 1962  6 Sheets-Sheet 1

INVENTOR.
GEORGE W. WASSELL
BY
his ATTORNEYS

June 7, 1966  G. W. WASSELL  3,254,432
DATA DISPLAYING DEVICE
Filed Dec. 24, 1962  6 Sheets-Sheet 2

INVENTOR.
GEORGE W. WASSELL
BY
Brumbaugh, Free, Graves & Donohue
his  ATTORNEYS

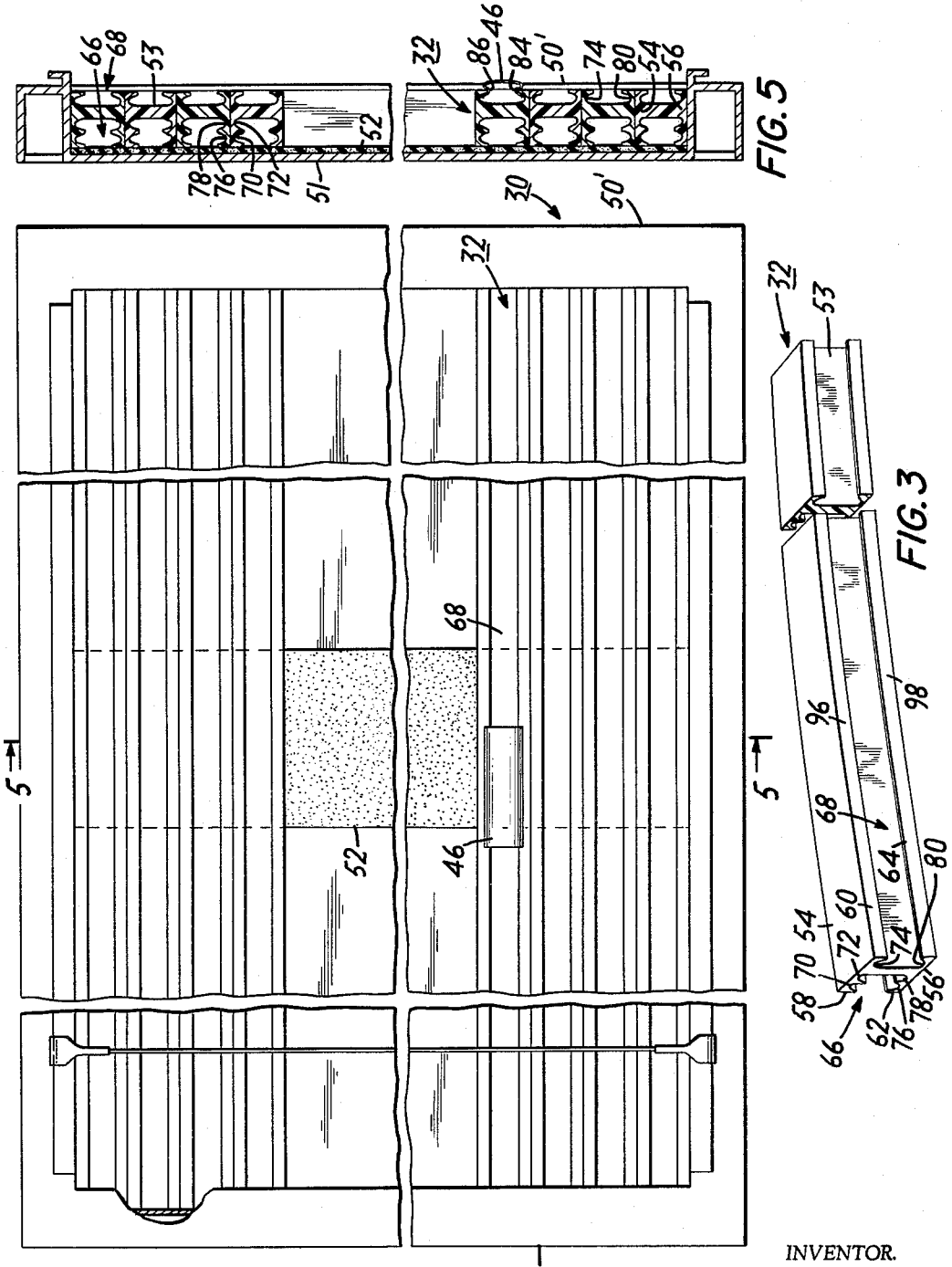

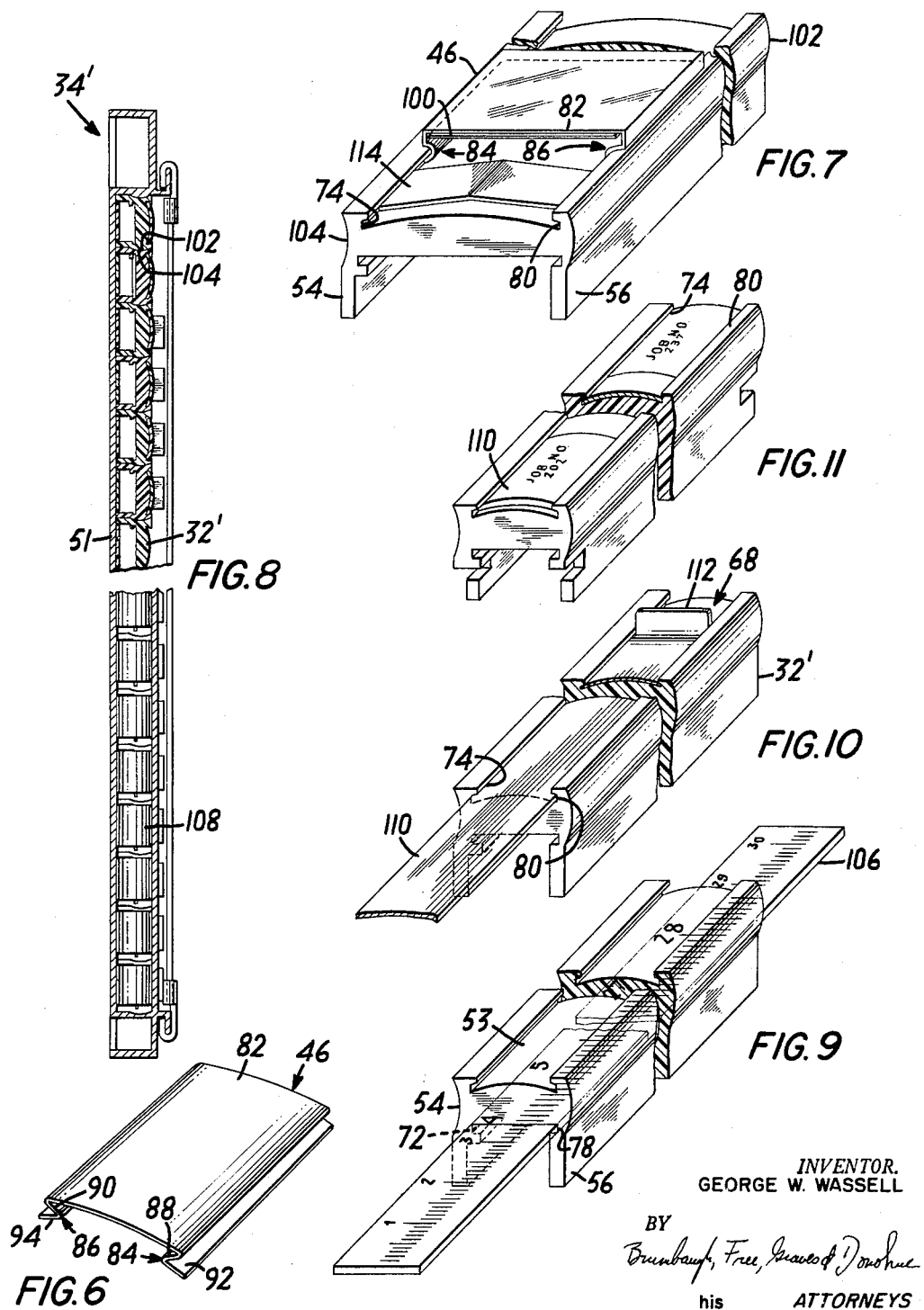

June 7, 1966   G. W. WASSELL   3,254,432
DATA DISPLAYING DEVICE

Filed Dec. 24, 1962   6 Sheets-Sheet 5

INVENTOR.
GEORGE W. WASSELL

BY
his ATTORNEYS

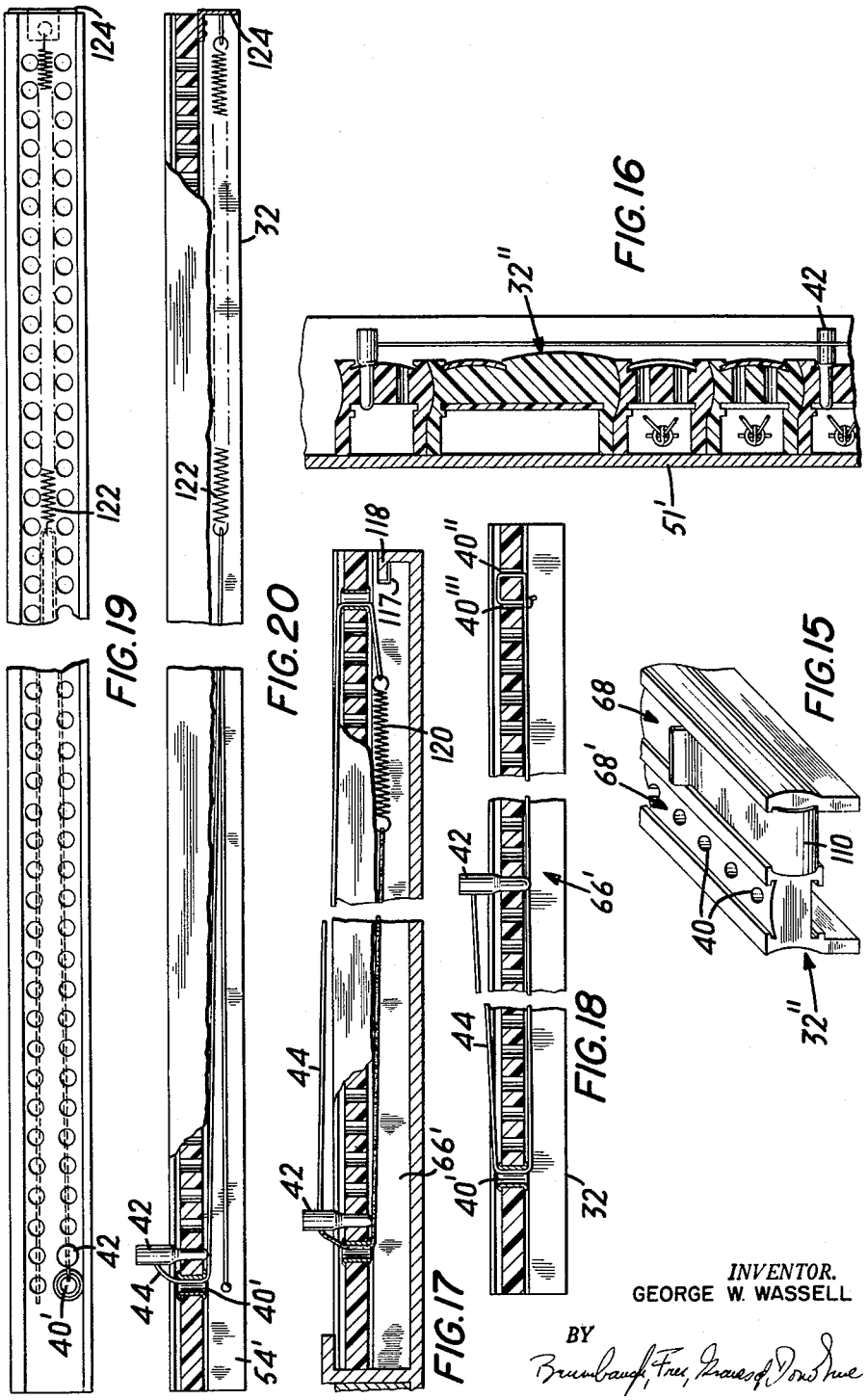

United States Patent Office 3,254,432
Patented June 7, 1966

3,254,432
DATA DISPLAYING DEVICE
George W. Wassell, Westport, Conn., assignor to Wassell Organization, Inc., Westport, Conn., a corporation of Delaware
Filed Dec. 24, 1962, Ser. No. 246,797
13 Claims. (Cl. 40—16)

This invention relates to data displaying devices and, more particularly, to such devices wherein data may be posted in rows adjacent to one another and wherein the rows of data are easily removable and interchangeable.

This application is a continuation-in-part of my copending applications Serial Nos. 813,013 and 813,014, both of which were filed on May 13, 1959, now abandoned.

Visual indicator boards are frequently used to display notices and chart data related to business functions, such as the progress of various production processes, for example, to aid in controlling the operations of these functions. Usually the indicator boards are composed of a plurality of parallel item lines or data rows, with the data related to each aspect of the function under control being assigned to a different row. Typically, one side of the board is provided with a coordinate against which the data in the rows is plotted. For example, the data rows may plot the output of various machines in a factory operation, each row designating a different machine, and the coordinate referred to may relate machine output to time, so that the output of each machine for every hour or every day may be easily ascertained.

In the past, indicator boards have not been sufficiently adaptable to handle data which is constantly changing. Although adaptability has been imparted by rendering the data displaying elements forming the data rows removable and interchangeable, little has been done to render the individual elements capable of handling changing data. It is, therefore, an object of the present invention to provide an improved indicator board.

This is accomplished in the present invention by providing an indicator board composed of a plurality of easily removable and easily interchangeable data displaying elements. Each of the elements is formed from a longitudinally extending member which is retained in place in the board by a frame advantageously positioned around the periphery of the board which engages the ends of the member. Each element is preferably bowed, and is flexed to insert it into place in the board, the bowing of the element urging the element firmly against the surface of the board. In addition, the surface of the board is provided with one or more resilient strips which frictionally engage the element and retain it securely in place and prevent slippage, while at the same time permitting simple removal of the element.

Each of the elements is provided with one or more channels into which a data member may be positioned. For example, in the case of a production control board utilizing a data displaying element having one or more rows of holes therein adapted to receive signal pegs, the peg holes being calibrated so that the positions of the pegs indicate the status of the function being charted, the channel may be formed through the element and may receive for anchoring a cord which is attached at one end to a signal peg. The cord advantageously may be elastic and colored, and thus the exposed portion of the cord outside the channel provides a readily perceived value of the function being plotted, while the anchored portion within the channel is hidden from view. Thus, the cord, peg, and data displaying element with its channel together form a single, easily removable and replaceable unit.

The data displaying element just described may advantageously be formed from a pair of side walls and a body portion bridging the side walls which together form the channel referred to. This structure is easily fabricated, typically by the process of extrusion, with the holes being easily stamped therein. With this type of element, the edges of the walls may be used to support the element against a supporting surface, and the body portion may be transparent, in which case data inserts, such as marked or calibrated tapes, for example, may be positioned in the channel and viewed through the body portion. If the body portion is positioned intermediate the edges of the side walls, then a second channel is formed on the outside surface of the body portion. In this case the data displaying element may also be formed without the holes, and the second channel may then receive inserts, such as calibrated tapes, for example, which may be compared with the data contained in the channel underneath the transparent body portion.

Additionally, the invention contemplates a unique slidable signal used in conjunction with a data displaying element having a body portion and upwardly extending side walls. The signal is typically made of thin sheet plastic material susceptible of being easily cut with a pair of scissors, and is formed with a main section which bridges the side walls and two generally transversely extending side pieces which are compressible against the main section and which are adapted to engage the side walls. Thus, the signals may be easily cut to any size in use, the side pieces being compressed and simply cut by the scissors. Thereafter, the signals may be flexed and easily snapped into place on the data displaying elements. When the transversely extending side pieces engage inner sides of the side walls, the signal does not extend beyond the width of the data displaying element, thereby allowing the elements to be stacked one against another without affecting the sliding action of the signals.

The signals may be made of colored plastic to aid in the visual presentation, and may be made transparent or translucent, thereby allowing the data in the channels below to be viewed through the slidable signal, if desired, or, in the event that it is desired to blank out that portion of the data displaying element, the slidable signal may be formed from an opaque material.

A detailed description of the invention follows, which is to be read in conjunction with the appended drawings, in which:

FIG. 3 is a perspective view of a data displaying element in accordance with the invention;

FIG. 4 is a plan view of an indicator board in accordance with the invention showing the details of a resilient strip to retain the data displaying elements in place in the board;

FIG. 5 is a sectional view of the indicator board shown in FIG. 4, taken generally along the section line 5—5 of that figure and looking in the direction of the arrows;

FIG. 6 is a perspective view of a flexible signal in accordance with the invention;

FIG. 7 is a perspective view of a data displaying element in accordance with the invention;

FIG. 8 is a sectional view of the indicator board shown in FIG. 2, taken generally along the section line 8—8 of that figure and looking in the direction of the arrows;

FIGS. 9 through 15 are perspective views of data displaying elements in accordance with the invention;

FIG. 16 is a sectional view of a portion of the indicator board shown in FIG. 1, taken generally along the section line 16—16 of that figure and looking in the direction of the arrows;

FIGS. 17 and 18 are sectional side views of data displaying elements incorporating signal peg and cord arrangements in accordance with the invention; and FIGS. 19 and 20 are plan and sectional side views, respectively, of a data displaying element incorporating a further signal peg and cord arrangement as contemplated by the invention.

Figure 1:
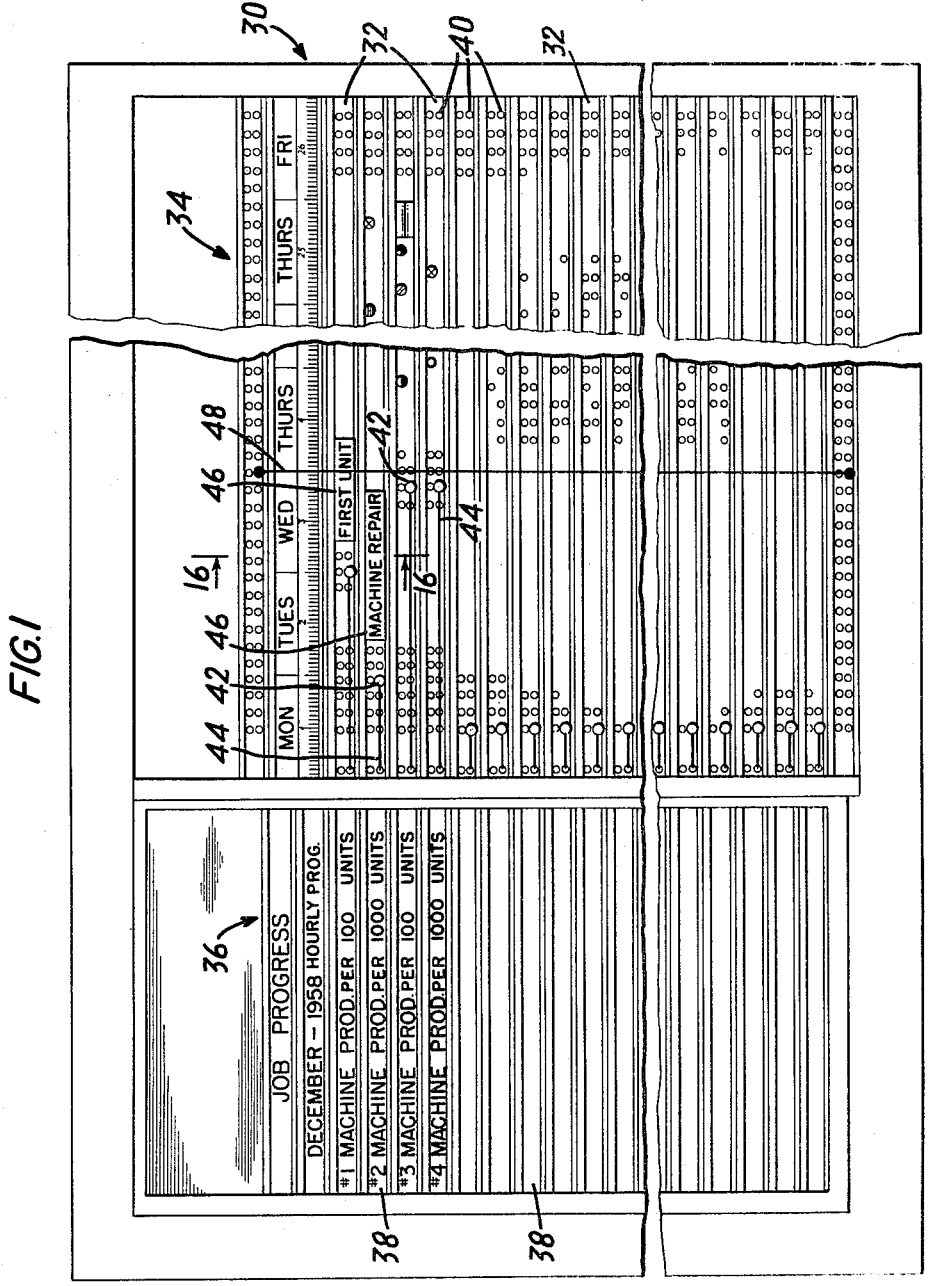
FIGS. 1 and 2 are plan views of indicator boards in accordance with the invention.

Referring to FIG. 1, an indicator board 30, of the production control type, is shown. The board is formed from a plurality of components or data displaying elements 32 which are stacked adjacent to each other in a right-hand or "control" section 34. A left-hand or "record" section 36 contains similar elements 38 which indicate the production items charted on the board.

In the arrangement shown in FIG. 1, each of the data displaying elements 32 is formed with one or more rows of holes 40 therein, any one of which is adapted to receive a signal peg 42. In the interests of simplicity and clarity, the rows of holes have not been shown as extending along the full length of each of the elements. A cord 44, preferably colored, attached at one end to the peg 42 provides a clear indication of the position of the peg.

Each of the data displaying elements may carry a slidable signal 46 thereon that provides additional information. Additionally, a "day line" 48 extending across the board may mark the present time so that the instantaneous production control situation can be readily visualized by viewing the portions of the data displaying elements 32 lying immediately under the line.

In the display of FIG. 1, and using machine No. 2 as an example, machine production for Monday is indicated by the peg 42 and the cord 44 associated with the machine. As shown, machine No. 2 is indicated by the signal 46 as being set aside for repair during portions of Tuesday and Wednesday.

Figure 2:
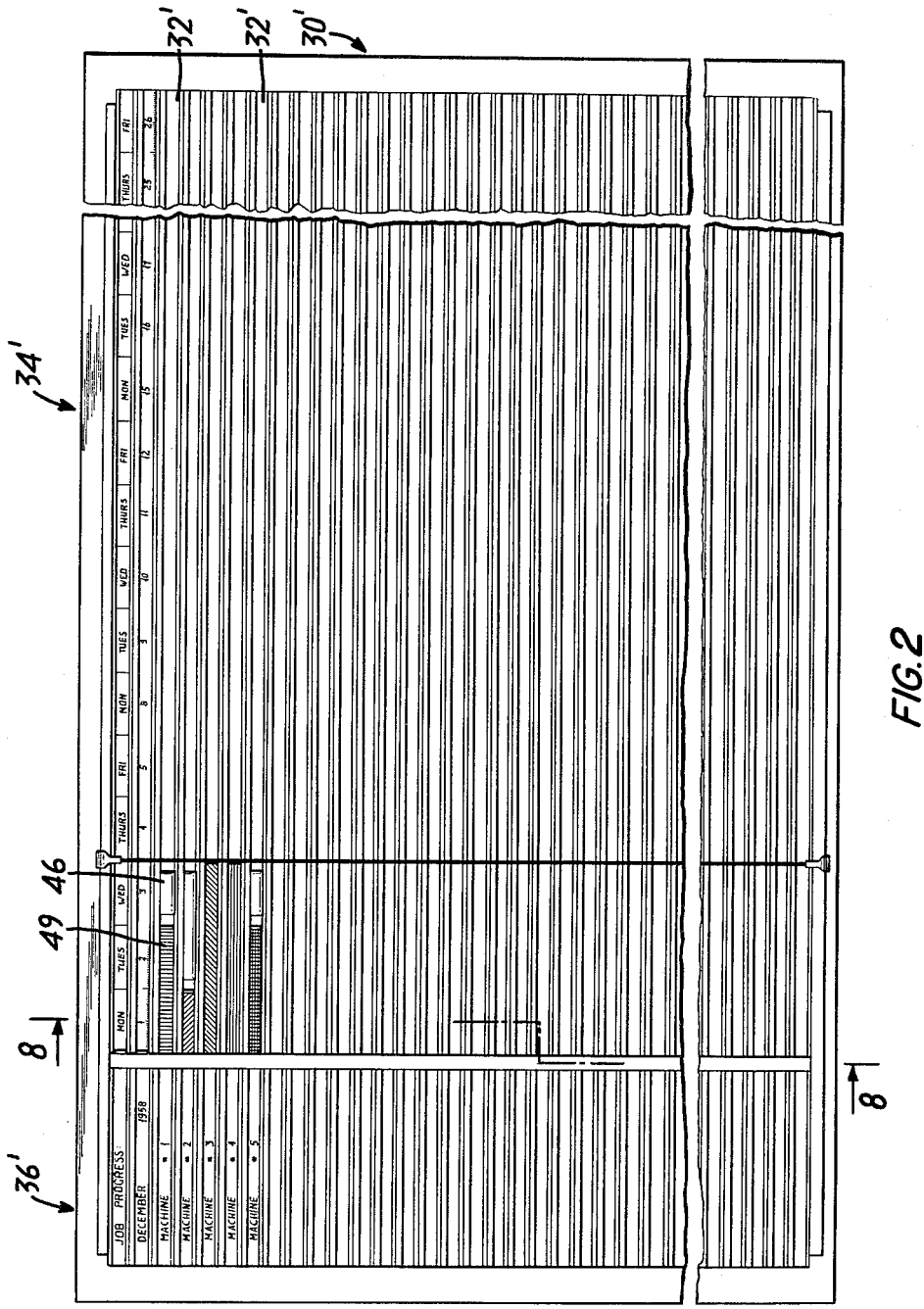

A similar arrangement is shown in FIG. 2, namely, an indicator board 30' of the type designed to hold data displaying elements 32' adapted to carry only slidable signals 46 and data inserts 49 rather than the pegs 42 of the board of FIG. 1. The board embodies the same indicating philosophy as that of FIG. 1 with a control section 34' charting the production processes of items enumerated in record section 36'.

FIG. 3 shows a typical data displaying element 32 in accordance with the invention and of the type useful in the indicator board of FIG. 2, for example. It typically is formed from plastic by extrusion and, following the extrusion process, has a slight bow therein, as shown in FIG. 3. This bowing of the data displaying element aids in retaining the element in place in the indicator board 30, as shown in FIG. 4.

Referring to FIG. 4, as well as to FIG. 5, it may be noted that the board 30 is formed with frame flanges 50 and 50' on the two sides thereof and a back piece or supporting surface 51. One or more strips 52 of resilient material of high coefficient of friction are adhered to the surface 51 and engage the data displaying elements 32 when they are positioned on the board. Specifically, each element 32 is flexed and its ends are inserted under the flanges 50 and 50'. Due to the bowing of the element, it is urged against the strip 52 and is retained by the strip in place. In this fashion, the board 30 may be positioned vertically against a wall, and any one or more of the elements 32 may be removed therefrom without disturbing the arrangement of elements.

It has been found that the strip 52 may be advantageously formed from sponge rubber, approximately 1½" wide and ⅟₁₆" thick, with one strip sufficing for data displaying elements 36" or less long. In the case of longer elements, two or more strips preferably equidistantly spaced may be employed.

Referring back to FIG. 3, the data displaying element 32 is formed with a transparent body portion 53 that bridges two side walls 54 and 56. The body portion 53 is positioned intermediate the edges 58 and 60 of the side wall 54 and intermediate the edges 62 and 64 of the side wall 56. The side walls 54 and 56 together with the body portion 53 form a channel 66 on one side of the body portion 53 and another channel 68 on the other side of the body portion for the reception of data, such as the slidable signal 46 shown in FIGS. 4 and 5 in the channel 68, for example.

The side walls 54 and 56 of the element 32 of FIG. 3 are effectively grooved, as at 70, 72, 74, and 76, 78, 80, respectively, to retain data inserts or slidable signals securely in the channels. For example, the grooves 74 and 80 serve to retain the slidable signal 46 shown in FIGS. 4 and 5 in the channel 68. For this purpose, the slidable signal 46 may be formed from a flexible sheet plastic material with, as shown in FIG. 6, a flexible section 82 and two side pieces 84 and 86 generally extending transversely to the section 82. The side pieces 84 and 86 include first portions 88 and 90, respectively, that extend toward each other, and second portions 92 and 94, respectively, that extend away from each other, thereby to form compressible V-shaped side pieces.

In use, the flexible signal 46 may be cut to any convenient length with a pair of scissors since, during the cutting, the V-shaped side pieces 84 and 86 are easily compressed, thereby to facilitate the cutting. The signal itself is then flexed to bend the flexible section 82 so that the signal may be inserted in the channel 68 of the element 32, as shown in FIG. 5. As may be seen from FIG. 5, and also referring to FIGS. 3 and 6, the side wall portions 92 and 94 that extend away from each other engage the grooves 80 and 74 of the channel 68, and the flexible section 82 of the signal bridges the side walls 54 and 56. In this regard, the side walls 54 and 56 are formed with flanges 96 and 98, respectively, as shown in FIG. 3, which aid in forming the grooves 74 and 80, respectively, and which securely engage the V-shaped side pieces 86 and 84 of the signal 46 shown in FIG. 6.

The flexible signal 46 may be made transparent or translucent and of different colors to denote various data items and to aid in the visual presentation of the indicator board. Further, the signal may be treated on the section 82 so that it is capable of being written upon; for example, to be labeled, "Machine Repair," as is the signal 46 of FIG. 1 related to machine No. 2. Additionally, the signal 46 may be formed as shown in FIG. 7, wherein it is adapted to carry an insert 100 which is retained by the signal under the section 82 to be viewed therethrough and to contain written or printed information, for example.

As may be noted from FIGS. 5 and 7, which show the signal 46 in place in a data displaying element, since the grooves 74 and 80 are on inside portions of the side walls 54 and 56, respectively, the side pieces 86 and 84 of the signal are carried inside the side walls 54 and 56 of the data displaying element. In this fashion, the elements 32 may be stacked one against the other as shown in FIG. 5 without inhibiting the sliding action of the flexible signals.

Moreover, the type of signals 46 shown in FIGS. 5, 6 and 7 may be moved along the data displaying element with no danger that adjacent signals will override each other as often occurred in the past with simple paper signals, thereby obscuring information that should have appeared on the board.

In stacking the data displaying elements 32 one against the other, as shown in FIG. 5, the elements are retained against the back piece 51 of the board because of the bowing of the elements, as described above. Alternatively, however, the elements may be formed as shown in FIG. 7 with a convex portion 102 in the side wall 56 and a concave portion 104 in the side wall 54. The convex portion 102 of each element is adapted to fit into the concave portion 104 of an adjacent element as shown in FIG. 8 so that the elements interfit against each other and are retained against the back piece 51.

Figure 12:
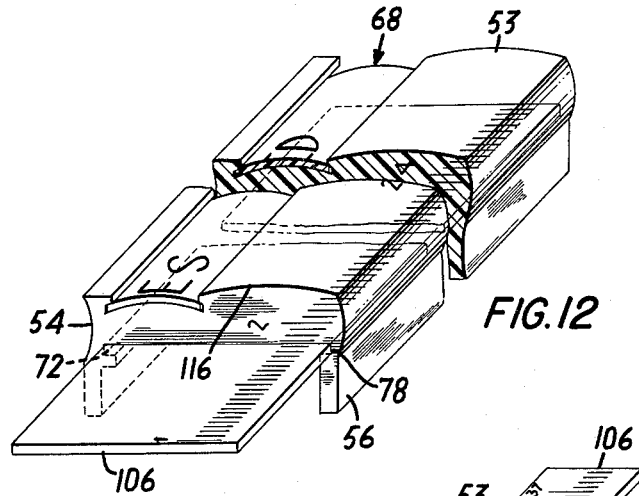

Referring again to FIG. 3, it was noted above that grooves 70 and 72 in the side wall 54 and grooves 76 and 78 in the side wall 56 to serve to retain data inserts in the channel 66. One of such inserts, 106, is shown in FIGS. 9 and 12 and is carried within the grooves 72 and 78. The insert may be marked to provide a reference scale, denoting hours of the day or days of the week, for example, which may be viewed through the transparent body portion 53 of the data displaying element to calibrate suitably the element.

The lower grooves 70 and 76 of the element shown in FIG. 3 are not included in the elements shown in FIGS. 9 and 12. Such lower grooves may carry an insert similar to the insert 106 of FIGS. 9 and 12, or they may carry the extension of an insert carried by another set of grooves, as shown in FIG. 8, wherein a slidable tape 108 is looped so that one end of the tape is inserted in the grooves 70 and 76 and the other end of the tape is inserted into another set of grooves.

As shown in FIG. 10, the grooves 74 and 80 in the channel 68 may carry a slidable tape 110 therein which has a projection 112 at one end thereof to facilitate pushing the tape along the channel. The tape may be marked as shown in FIG. 11, or it may be cut to provide a series of individual inserts 114 as shown in FIG. 7.

The data displaying element may also be formed as shown in FIG. 12 with the channel 68 only on one side of the element, the remainder of the element comprising a generally convex section 116 which serves as a magnifying lens that views the tape 106 below the body portion 53.

As may be noted, the data displaying elements of FIGS. 3, 7, and 9 through 12 may be added to or removed from or moved about within the indicator board without disturbing the arrangement of the other elements in the board or the display of data in that or any other element.

Figure 13:
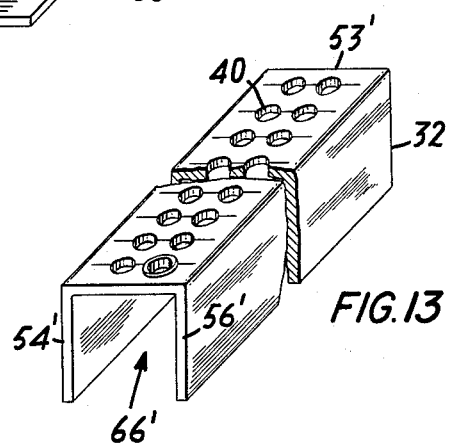

FIG. 13 shows a data displaying element 32 in accordance with the invention and of the type useful in the indicator board of FIG. 1, for example. It is similar to the element 32 of FIG. 3 in that it is formed with a body portion 53' which bridges a pair of side walls 54' and 56' and which forms together with the side walls a channel 66'. Typically, the element 32 is extruded from aluminum or plastic material, and the holes 40 therein, which are adapted to receive the signal peg 42 as shown in FIG. 1, may be easily formed by stamping. Preferably, the edges of the holes 40 are rounded to avoid scraping the pegs 42 as they are positioned within and removed from the holes.

Figure 14:
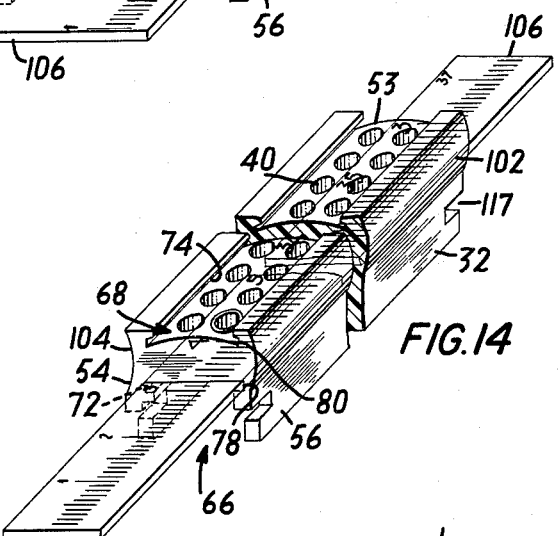

The element 32 may be formed as shown in FIG. 14 so that it is similar to the element shown in FIG. 11 with holes 40 added thereto. Specifically, the body portion 53 may bridge the side walls 54 and 56 intermediate the edges of the side walls thereby to form the channels 66 and 68. Additionally, the side walls may be grooved, as at 74 and 80 in the channel 68 and 72 and 78 in the channel 66, to receive inserts or slidable tapes therein, such as the slidable tape 106 shown in the channel 66, for example. In this case, the body portion 53 is made transparent so that the tape 106 may be viewed therethrough.

FIG. 15 shows a further data displaying element 32" combining features of the elements 32 and 32'. Specifically, one portion of the element may be formed with a row of holes 40 therein adapted to receive the signal pegs 42, while the other half of the element is adapted to receive the slidable tape 110, for example. In addition, channels 68 and 68' are both adapted to receive flexible signals, such as the signal 46 shown in FIG. 6.

The data displaying elements of FIGS. 13 through 15 may be formed with bows therein and retained in place in the indicator board 30 in a fashion similar to that in which the data displaying element 32 is retained in place as shown in FIG. 4 and as described above. If formed with a convex side portion 102 and a concave side portion 104, as shown in FIG. 14, they may be placed so that they interfit against one another, as shown in FIG. 16, to be retained against back piece 51' of the indicator board. Further, the data displaying elements may be notched at their ends, as shown in FIG. 14 at 117, so that when positioned within the indicator board, as shown in FIG. 17, the notched portion 117 may be engaged by a flange 118 forming a portion of the indicator board to retain the data displaying element in place.

As noted above with respect to FIG. 1, the pegs 42 positioned within the holes 40 in the data displaying elements 32 have cords 44 attached thereto to indicate readily the positions of the pegs in the indicator board. As shown in FIG. 18, one end of the cord 44 is advantageously attached to the peg 42 and the other end of the cord is looped through a hole 40' at one end of the element 32 to pass into the channel 66' in the element. The cord then passes to the other end of the element wherein it is looped through adjacent holes 40" and 40''' and is knotted within the channel 66'. In this case, the cord 44 is typically formed from elastic material and, as may be seen, the portion of the cord between the holes 40' and 40", not used to indicate the position of the peg 42, is hidden from view within the channel 66'.

In the arangement shown in FIG. 17, the cord 44 is typically formed from a non-elastic material and is attached at its ends to a spring 120 which provides proper tensioning. In this case, the spring 120 is well hidden from view within the channel 66' of the data displaying element.

Another arrangement is shown in FIGS. 19 and 20 wherein the cord 44 is attached at one end to the peg 42, is looped through a hole 40' in one end of the data displaying element 32, is looped through one end of a spring 122, and is attached at its other end to the side wall 54' of the data displaying element. The spring 122 is attached at its other end to a right-angled member 124 attached to the data displaying element.

In all the arrangements of FIGS. 17 through 20, the data displaying element, with its peg 42 and cord 44, forms an element complete in itself, which may be added to or removed from the indicator board or moved within the board, without disturbing the data in the element.

Thus, there has been described a unique indicator board formed from novel data displaying elements each of which is adapted to be simply and easily added to, moved about in, or removed from the frame without disturbing the arrangement of the other elements or the arrangement of data in that or other elements. The element is formed uniquely from a body portion and two side walls which together form one or more channels for the reception of data therein, and, through the use of a bowed element and a resilient strip in an indicator board, the elements are retained in place within the board and prevented from slipping. Further, a unique signal has been described, capable of being easily cut and easily snapped into place onto the data displaying element.

It may be appreciated that the various embodiments described are subject to modifications which will not materially depart from the general aspects of the invention. Accordingly, such modifications should be deemed to be encompassed by the invention, which is defined solely by the following claims.

I claim:

1. A component especially adapted to receive and display data, comprising a relatively long slender column made of a flexible plastic transparent material and having a longitudinal axis and at least two oppositely directed surfaces parallel to said axis, a pair of longitudinally disposed walls positioned adjacent to one of said surfaces and forming therewith a channel parallel to said longitudinal axis, said pair of walls having longitudinally disposed grooves opening to said channel and adapted to receive data, the other of said surfaces having at least one row of holes formed in said column, said row extending parallel to said longitudinal axis of said column, a peg adapted to be received by said holes, a cord attached to said peg and looped around at least one end of said column, said peg being movable along said row of holes and said cord being adapted to move along with said peg.

2. A component especially adapted to receive and display data, comprising a relatively long slender column made of a transparent material and having a longitudinal axis and at least two oppositely directed surfaces parallel to said axis, a pair of longitudinally disposed walls positioned adjacent to one of said surfaces and forming therewith a channel parallel to said longitudinal axis, said walls having longitudinally disposed grooves opening to said channel and adapted to receive data, the other of said surfaces having at least one row of holes formed in said column, said row extending parallel to said longitudinal axis.

3. A component adapted to be mounted with other similar components to receive and display data, comprising a longitudinally extending member having a pair of side walls, a transparent body portion bridging the side walls, the body portion being formed with at least one row of holes therein for receiving a signal peg, a first channel defined by the walls on the side of the body portion facing the supporting surface, and grooves in the side walls at each side of the first channel to receive and retain data to be displayed.

4. A component adapted to be mounted with other similar components to receive and display data, comprising a longitudinally extending member having a pair of side walls adapted to support the component against a supporting surface and a transparent body portion bridging the side walls intermediate of the ends of said side walls, the side walls forming two channels, one on each side of said body portion, the first channel having a frontal opening and internal grooves suitable for receiving and supporting a display signal, and the second channel formed by said side walls on the opposite side of said transparent body portion and having at least one set of oppositely disposed internal grooves designed to receive a data insert, said data insert being viewable from the front of the data display through the transparent body portion although spaced from the frontal surface of the display whereby the data insert in said second channel is completely recessed between said side walls forming said second channel.

5. A component as recited in claim 4, wherein each of the side walls in the portion forming said second channel contains one groove, the pair of grooves so formed together forming a means for retaining a data insert therein.

6. A component as recited in claim 4, wherein each of the side walls in the portion forming said second channel contains two grooves therein, thereby to form two pairs of grooves for retaining two data inserts therein, one of the inserts being in some instances the extension of an insert retained by another portion of the component.

7. A component as recited in claim 4 wherein the transparent body portion is formed with at least one row of holes therein for receiving a signal peg.

8. A component adapted to be mounted with other similar components to receive and display data, comprising a longitudinally extending member having a pair of side walls adapted to support the component, and a body portion bridging the side walls having at least one row of holes therein for receiving a signal peg.

9. The component as recited in claim 8, wherein a channel is defined by the walls on one side of the body portion, and grooves in the side walls on each side of the channel to receive and retain data to be displayed.

10. In combination with a component as recited in claim 8, a signal peg positioned in one of said holes, and a cord attached at one end thereof to the signal peg and at its other end to a portion of the component.

11. In combination with a component as recited in claim 8, a signal peg positioned in one of said holes, and a cord attached to the signal peg having a portion thereof positioned between the side walls of the component on the side of the body portion opposite from that containing the signal peg.

12. A component adapted to be mounted with other similar components to receive and display data, comprising a longitudinally extending member having a portion forming an exposed surface with at least one row of holes therein, at least one signal peg adapted to be inserted into any one of said holes, a longitudinal channel through the member beneath the exposed surface, and a cord attached to the signal peg having a part thereof positioned within the channel.

13. A component adapted to be mounted with other similar components to receive and display data, comprising a longitudinally extending member having a pair of side walls adapted to support the component against a supporting surface, a body portion bridging the side walls, a first longitudinally extending part of the body portion containing at least one row of holes therein to receive a signal peg, and means extending longitudinally along the body portion and forming together with the body portion a longitudinally extending channel parallel to said longitudinally extending part of the body portion into which a data element is positioned.

References Cited by the Examiner

UNITED STATES PATENTS

| | | |
|---|---|---|
| 1,943,168 | 1/1934 | Doppel _____ 40—16 |
| 1,970,822 | 8/1934 | Sommers _____ 40—63 |
| 2,172,528 | 9/1939 | Auer. |
| 2,451,581 | 10/1948 | Slavsky _____ 40—16 |
| 2,513,456 | 7/1950 | Cronquist _____ 40—16 X |
| 2,588,635 | 3/1952 | Junkin _____ 40—140 X |
| 2,730,824 | 7/1956 | Cohen _____ 40—1.5 |
| 2,787,068 | 4/1957 | Anspach _____ 40—16 X |

FOREIGN PATENTS 1,090,948   10/1960   Germany.

EUGENE R. CAPOZIO, *Primary Examiner.*

JEROME SCHNALL, *Examiner.*

W. J. CONTRERAS, *Assistant Examiner.*